(12) United States Patent
Cremer (10) Patent No.: US 12,147,105 B2
(45) Date of Patent: Nov. 19, 2024

(54) WAVEGUIDE OF AN SOI STRUCTURE

(71) Applicant: STMicroelectronics (Crolles 2) SAS, Crolles (FR)

(72) Inventor: Sebastien Cremer, Sassenage (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 0 days.

(21) Appl. No.: 17/988,141

(22) Filed: Nov. 16, 2022

(65) Prior Publication Data

US 2023/0074527 A1 Mar. 9, 2023

Related U.S. Application Data

(62) Division of application No. 16/931,202, filed on Jul. 16, 2020, now Pat. No. 11,531,224.

(30) Foreign Application Priority Data

Jul. 19, 2019 (FR) ...................... 1908193

(51) Int. Cl.
*G02F 1/1333* (2006.01)
*G02B 6/13* (2006.01)
*G02F 1/01* (2006.01)

(52) U.S. Cl.
CPC ......... *G02F 1/133345* (2013.01); *G02B 6/13* (2013.01); *G02F 1/011* (2013.01); *G02F 1/133382* (2013.01); *G02F 1/0113* (2021.01); *G02F 1/133357* (2021.01)

(58) Field of Classification Search
None
See application file for complete search history.

(56) References Cited

U.S. PATENT DOCUMENTS

| | | |
|---|---|---|
| 10,509,244 B1 | 12/2019 | Shank et al. |
| 2015/0140720 A1 | 5/2015 | Collins |
| 2016/0170139 A1 | 6/2016 | Absil et al. |
| 2018/0011244 A1 | 1/2018 | Zhu et al. |
| 2018/0372950 A1 | 12/2018 | Usami |
| 2019/0196099 A1 | 6/2019 | Watanuki et al. |
| 2019/0196231 A1* | 6/2019 | Kawai ............... G02F 1/025 |

* cited by examiner

*Primary Examiner* — Ashok Patel
(74) *Attorney, Agent, or Firm* — Slater Matsil, LLP (57) ABSTRACT

A method includes forming a layer made of a first insulating material on a first layer made of a second insulating material that covers a support, defining a waveguide made of the first material in the layer of the first material, covering the waveguide made of the first material with a second layer of the second material, planarizing an upper surface of the second layer of the second material, and forming a single-crystal silicon layer over the second layer.

21 Claims, 4 Drawing Sheets

WAVEGUIDE OF AN SOI STRUCTURE

CROSS-REFERENCE TO RELATED APPLICATIONS

This application is a divisional of U.S. patent application Ser. No. 16/931,202, filed Jul. 16, 2020, which claims priority to French Patent Application No. 1908193, filed on Jul. 19, 2019, which applications are hereby incorporated herein by their reference.

TECHNICAL FIELD

The present disclosure generally concerns an SOI structure waveguide.

BACKGROUND

Photonic integrated circuits formed from a SOI structure are known. One or a plurality of active components are formed inside and/or on top of a single-crystal silicon layer of the SOI structure, and one or a plurality of silicon waveguides are defined in the single-crystal silicon layer of the SOI structure.

The circuits further comprise an interconnection structure resting on the single-crystal silicon layer. The interconnection structure comprises portions of metal layers separated from one another by insulating layers, and conductive vias crossing at least some of these insulating layers to electrically couple the components to one another and/or to electric connection pads arranged at the level of an upper surface of the interconnection structure.

One or a plurality of waveguides, typically made of silicon nitride, may then be arranged in an insulating layer, typically made of silicon oxide, of the interconnection structure.

SUMMARY

The embodiments of the present disclosure generally concern photonic integrated circuits and methods of manufacturing the same. Particular embodiments relate to photonic integrated circuits formed from a silicon-on-insulator or SOI-type structure.

Embodiments can overcome disadvantages of known photonic integrated circuits formed from a SOI structure, for example, of the above-described known photonic integrated circuits. Embodiments can also overcome all or part of the disadvantages of methods of manufacturing known photonic integrated circuits formed from a SOI structure, for example, the above-described known photonic integrated circuits.

Embodiments can overcome disadvantages of known photonic integrated circuits formed from a SOI structure, for example, known photonic integrated circuits comprising at least one waveguide made of a material other than single-crystal silicon such as silicon nitride.

Embodiments can overcome disadvantages of known photonic integrated circuits formed from a SOI structure and comprising a silicon nitride waveguide, for example, a silicon nitride waveguide configured to guide an optical signal having a wavelength in the range from 1,500 to 1,600 nm, for example, equal to 1,550 nm.

Embodiments can overcome disadvantages of methods of manufacturing known photonic integrated circuits formed from a SOI structure, for example, when the circuits comprise at least one waveguide made of a material other than single-crystal silicon such as silicon nitride.

Embodiments can overcome disadvantages of methods of manufacturing known photonic integrated circuits formed from a SOI structure and comprising a silicon nitride waveguide, for example, a silicon nitride waveguide configured to guide an optical signal having a wavelength in the range from 1,500 to 1,600 nm, for example, equal to 1,550 nm.

An embodiment provides a method comprising the successive steps of: a) forming a layer of a first insulating material on a first layer of a second insulating material covering a support; b) defining at least one waveguide made of the first material in the layer of the first material; c) covering the at least one waveguide made of the first material with a second layer of the second material; d) planarizing the upper surface of the second layer; and e) forming a single-crystal silicon layer resting on the second layer.

According to an embodiment, at step a), the layer of the first material is formed by deposition at a temperature greater than 500° C., preferably greater than 600° C., for example, a temperature of approximately 700° C.

According to an embodiment, at step a), the layer of the first material is formed by low pressure chemical vapor deposition (LPCVD).

According to an embodiment, the at least one waveguide made of the first material is configured to propagate an optical signal having a wavelength in the range from 1,500 to 1,600 nm, for example equal to 1,550 nm.

According to an embodiment, the method further comprises, after step e), a step of defining at least one silicon waveguide in the single-crystal silicon layer.

According to an embodiment, the method further comprises, after step e), a step of forming at least one germanium photodiode from the single-crystal silicon layer.

According to an embodiment, the method further comprises, after step e), a step of forming an interconnection structure resting on the single-crystal silicon layer.

According to an embodiment, the method further comprises, during the forming of the interconnection structure, a step of forming another waveguide, preferably made of the first material, embedded in an insulating layer, preferably made of the second material, of the interconnection structure.

Another embodiment provides a device comprising a support, an insulating layer resting on the support, a single-crystal silicon layer resting on the insulating layer, and at least one waveguide made of a first material embedded in the insulating layer. The insulating layer is made of a second material.

According to an embodiment, a structure of silicon-on-insulator type comprises the insulating layer and the single-crystal silicon layer.

According to an embodiment, at least one silicon waveguide is defined in the single-crystal silicon layer.

According to an embodiment, at least one germanium photodiode is arranged inside and/or on top of the single-crystal silicon layer.

According to an embodiment, the device further comprises an interconnection structure resting on the single-crystal silicon layer.

According to an embodiment, the device further comprises another waveguide, preferably made of the first material, embedded in an insulating layer, preferably made of the second material, of the interconnection structure.

According to an embodiment, the first material is silicon nitride, the second insulating material preferably being silicon oxide.

The foregoing and other features and advantages will be discussed in detail in the following non-limiting description of specific embodiments in connection with the accompanying drawings.

DETAILED DESCRIPTION OF ILLUSTRATIVE EMBODIMENTS

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. For example, the operation of the photonic integrated circuits and of the components, be they active, for example, a germanium photodiode, or passive, for example, waveguides, forming them have not been detailed, the described embodiments being compatible with the operation of usual photonic integrated circuits and of the usual components forming them. Further, the various applications where a photonic integrated circuit may be provided have not been described, the described embodiments being compatible with usual applications where a photonic integrated circuit is provided.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "approximately", "substantially", and "in the order of" are used herein to designate a tolerance of plus or minus 10%, preferably of plus or minus 5%, of the value in question.

FIGS. 1 to 5 illustrate successive steps of an embodiment of a manufacturing method.

Figure 1:
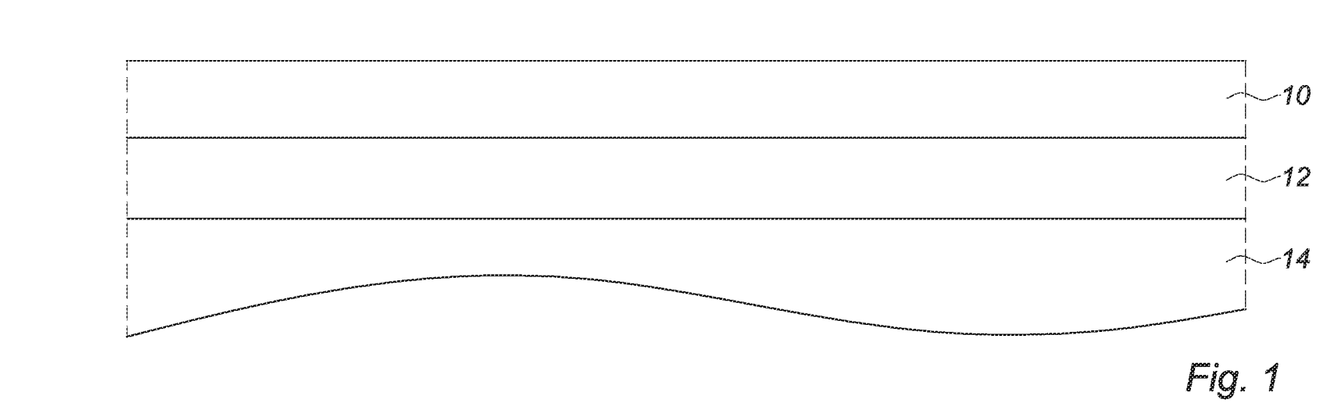
FIG. 1 is a simplified cross-section view illustrating a step of an embodiment of a manufacturing method.

FIG. 1 is a simplified cross-section view illustrating a step of the method.

At the step illustrated in FIG. 1, a (first) layer 10 of a first material, for example, insulating, preferably silicon nitride, has been formed on a layer 12 of a second insulating material, preferably silicon oxide, layer 12 resting on a support 14, for example, a silicon substrate. The lower surface of layer 10 is in contact with the upper surface of layer 12.

According to an embodiment, the lower surface of layer 12 is in contact with the upper surface of support 14. As a variation, one or a plurality of layers made of materials which may be different from that of layer 12 are interposed between the upper surface of support 14 and the lower surface of layer 12, that is, between support 14 and layer 12.

Preferably, layer 10 is formed by deposition, for example, by chemical vapor deposition or CVD, at a temperature greater than 500° C., preferably greater than 600° C., for example, at a temperature of approximately 700° C., for example, equal to 700° C. Preferably, layer 10 is formed by low pressure chemical vapor deposition or LPCVD.

Preferably, support 14 and layer 12 form a wafer or plate intended to become a SOI-type wafer from which a plurality of photonic integrated circuits will be formed. Layer 10 is formed all over the wafer, or, in other words, is formed full plate.

As an example, the thickness of layer 12 is in the range from 1 to 2 µm, for example, approximately equal to 1.5 µm, preferably equal to 1.5 µm.

As an example, the thickness of layer 10 is in the range from 300 to 650 nm, for example, equal to approximately 600 nm or to approximately 350 nm, preferably equal to 600 nm or to 350 nm. In the present example, the thickness of layer 10 is equal to 600 nm.

Figure 2:
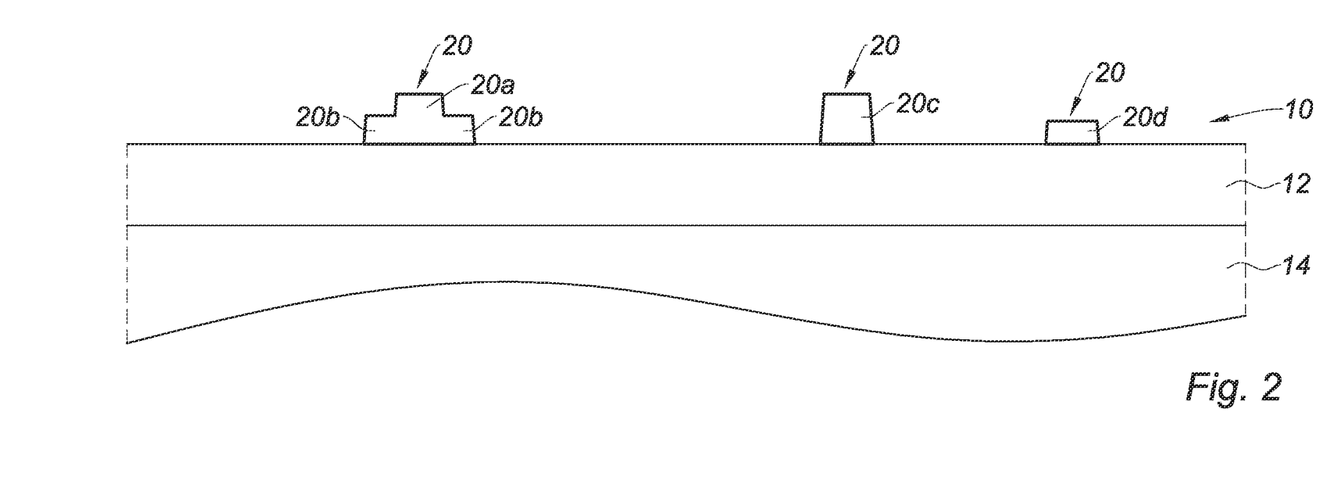
FIG. 2 is a simplified cross-section view illustrating another step of the manufacturing method.

FIG. 2 is a simplified cross-section view illustrating a next step of the method.

At the step illustrated in FIG. 2, one or a plurality of waveguides 20 have been defined in layer 10. Waveguides 20 are then made of the material of layer 10, silicon nitride in the present example.

In the example illustrated in FIG. 2, a first waveguide 20, on the left-hand side of the drawing, comprises a strip 20a having substantially the same thickness as layer 10 at the step of FIG. 1, and two ribs 20b laterally bordering strip 20a, on each side of strip 20a, ribs 20b being thinner than strip 20a. Such a waveguide is currently called a rib waveguide.

In the example illustrated in FIG. 2, a second waveguide 20, at the center of the drawing, only comprises a strip 20c. Such a waveguide is currently called a strip waveguide or ridge waveguide. Strip 20c has, in the present example, substantially the same thickness as layer 10 at the step of FIG. 1.

In the example illustrated in FIG. 2, a third strip waveguide 20, on the right-hand side of the drawing, comprises a strip 20d having, in the present example, a thickness smaller than the thickness of layer 10 at the step of FIG. 1. Strip 20d for example has the same thickness as ribs 20b. The thickness of strip 20d is for example approximately equal to 350 nm for a layer 10 having a thickness equal to 600 nm.

In other examples, not illustrated, one or a plurality of waveguides 20 having cross-sections with shapes different from those of the first, second, and third above-described waveguides 20 may be provided. In still another example, not illustrated, all the waveguides 20 may have cross-sections with similar or identical shapes.

The definition of the different above-described examples of waveguides 20 in layer 10 is within the abilities of those skilled in the art, for example, by successive steps of masking and etching of layer 10.

Preferably, waveguide(s) 20 are configured to guide an optical signal having a wavelength in the range from 1,500 to 1,600 nm, preferably equal to 1,550 nm.

Figure 3:
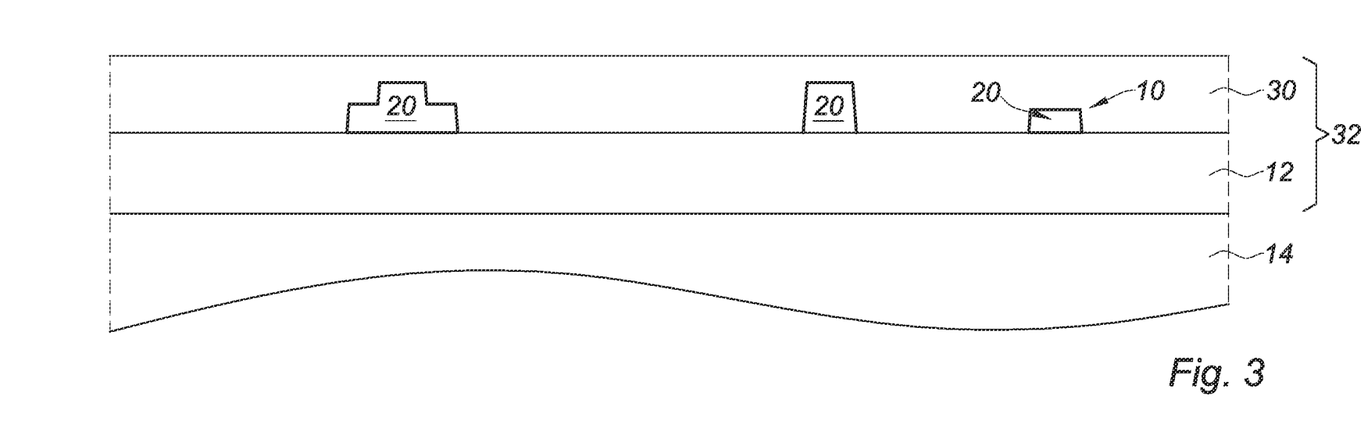
FIG. 3 is a simplified cross-section view illustrating another step of the manufacturing method.

FIG. 3 is a simplified cross-section view illustrating a next step of the method.

At the step illustrated in FIG. 3, a (second) layer 30 made of the same material as layer 12 has been formed all over the wafer (support 14, layer 12, and waveguide 20) to cover waveguides 20. Layer 30 is formed so that its upper surface, that is, its surface most remote from layer 12, is planar.

As an example, layer 30 is conformally deposited with a thickness greater than that of waveguides 20, that is, with a thickness greater than that of layer 10 at the step of FIG. 1, after which its upper surface is planarized, for example, by chemical-mechanical polishing (CMP).

Thus, waveguide(s) 20 are embedded in a layer 32 made of the second material, in the present example, silicon oxide. Layer 32 comprises layers 12 and 30. Preferably, layer 32 is formed by layers 12 and 30.

Figure 4:
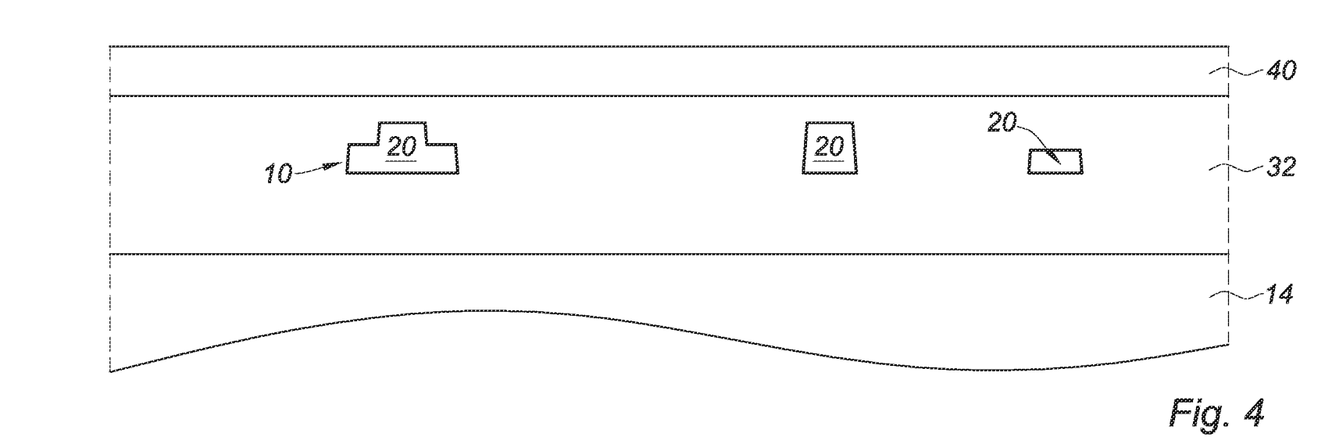
FIG. 4 is a simplified cross-section view illustrating another step of the manufacturing method.

FIG. 4 is a simplified cross-section view illustrating a next step of the method.

This step comprises forming a single-crystal silicon layer 40 resting on layer 32, that is, on the planar upper surface of layer 30 (FIG. 3). More particularly, this step comprises transferring a layer 40 onto layer 32, preferably by molecular bonding. Layer 40 is formed full plate, above the entire planar upper surface of layer 32, the surface of layer 40 arranged on the side of layer 32, or lower surface of layer 40, being parallel to and facing the upper surface of layer 32.

Although this is not illustrated, it is for example provided for layer 40 to be provided with a support or handle during the transfer, the handle being removed once the transfer has been performed. As an example, layer 40 has a thickness of approximately 300 nm, for example, equal to 310 nm. As an example, the bonding or transfer of layer 40 onto layer 32 is performed on implementation of the method designated with trademark "Smart Cut."

According to an embodiment, the transfer of layer 40 onto layer 32 is performed by directly transferring later 40 onto layer 32. Layer 40 then is in contact with layer 32. More particularly, a first surface (lower surface in FIG. 4) of layer 40 is then in contact with a first surface (upper surface in FIG. 4) of layer 32. In other words, layer 40 directly rests on layer 32.

According to another embodiment, not illustrated, prior to the transfer of layer 40 onto layer 32, an insulating bonding layer, for example, made of silicon oxide, is formed on the first surface of layer 40 and/or an insulating bonding layer, for example, made of silicon oxide, is formed on the first surface of layer 32. The first respective surfaces of layers 40 and 32 are than placed face to face and layer 40 is transferred onto layer 32, for example, by bonding the bonding layer of layer 40 directly to layer 32, by bonding layer 40 directly to the bonding layer of layer 32, or by bonding the bonding layer of layer 40 directly to the bonding layer of layer 32. There then only are bonding layers interposed between layer 40 and layer 32. In other words, layer 40 indirectly rests on layer 32 and, more particularly, layer 40 directly rests on one or a plurality of bonding layers, themselves directly resting on layer 32.

A SOI-type wafer or device is thus obtained. The SOI structure comprises single-crystal silicon layer 40 and layer 32 having layer 40 resting thereon, possibly with one or a plurality of, for example, two, bonding layers interposed between layers 40 and 32, and more particularly between the first respective surfaces of layers 32 and 40. Further, one or a plurality of waveguides 20 are embedded in the insulating layer 32 of the SOI structure.

Figure 5:
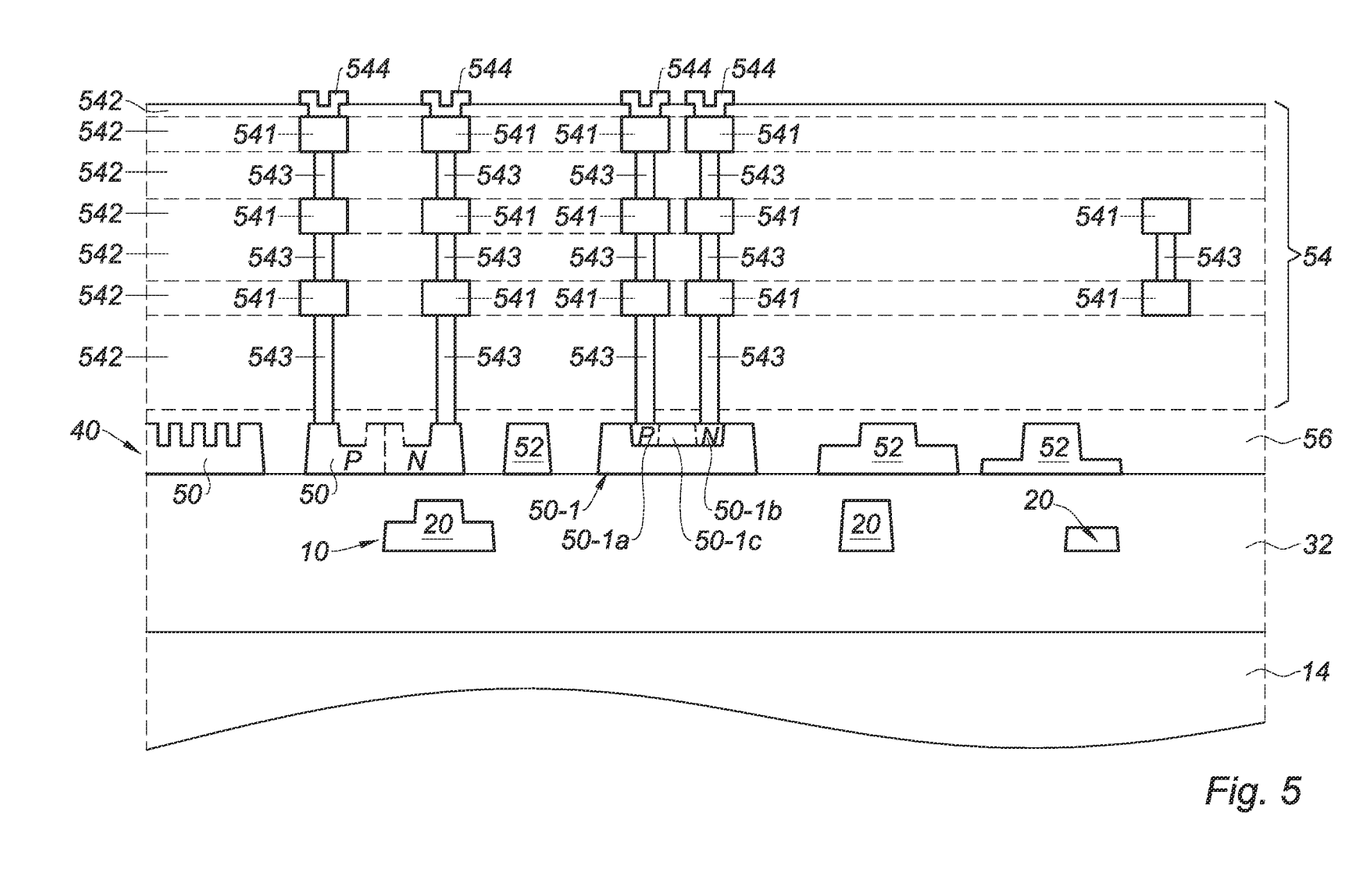
FIG. 5 is a simplified cross-section view of other steps of the manufacturing method.

FIG. 5 is a simplified cross-section view illustrating next steps of the method.

At a step illustrated in FIG. 5, optical and/or optoelectronic and/or electronic components 50 are formed from layer 40. In other words, components 50 are arranged inside and/or on top of layer 40. Still in other words, components 50 comprise portions of layer 40.

According to an embodiment, one of the components 50 formed is a germanium photodiode 50-1. Photodiode 50-1 has been formed from layer 40. As an example, photodiode 50-1 comprises germanium which is N-type doped, for example, with phosphorus atoms. As an example, photodiode 50-1 is formed by epitaxy of germanium from the silicon of layer 40, and then by doping of a first region 50-1a of the P-type germanium, for example, with boron atoms, and a second region 50-1b of the N-type germanium, for example, with phosphorus atoms. In the shown example, photodiode 50-1 is of PiN type and comprises an intrinsic (non-doped) germanium region 50-1c interposed between regions 50-1a and 50-1b.

The forming of components 50, and in particular of a germanium photodiode 50-1, from layer 40 is within the abilities of those skilled in the art, for example, by implementing masking, etching, doping, and/or epitaxy steps usual in the field of integrated photonics.

Further, at another step illustrated in FIG. 5, silicon waveguides 52 have been defined in layer 40. The definition of waveguides 52 in layer 40 is within the abilities of those skilled in the art, for example, by implementing steps of masking and of etching of layer 40. Preferably, at least certain steps of masking and etching of layer 40 are common with the forming of components 50 and of waveguides 52.

In the example illustrated in FIG. 5, the device comprises, from left to right in the drawing, a grating coupler, a phase modulator, a strip waveguide, germanium photodiode 50-1, a rib waveguide, and a deep rib waveguide, that is a rib waveguide having ribs with a thickness smaller than half the thickness of the strip of the waveguide.

After the forming of components 50 and of waveguides 52, at another step illustrated in FIG. 5, an interconnection structure 54 is formed, structure 54 resting on layer 40. For example, components 50 and waveguides 52 are first covered with an insulating layer 56, preferably planarized by CMP to have a planar upper surface, after which interconnection structure 54 is formed on layer 56.

Interconnection structure 54 comprises portions of metal layers 541 separated from one another by insulating layers 542. Interconnection structure 54 further comprises conductive vias 543 crossing insulating layers 542, where the portions of metal layers 541 are embedded to electrically couple portions of metal layers 541 together, to components 50, and/or to connection pads 544 formed at the level of the upper surface of interconnection structure 54.

In the embodiment illustrated in FIG. 5, interconnection structure 54 comprises no waveguide embedded in an insulating layer 542 of interconnection structure 54.

Although this has not been detailed herein, the steps described hereinabove in relation with FIGS. 1 to 5 are carried out to simultaneously form a plurality of photonic integrated circuits from a same SOI-type wafer such as illustrated in FIG. 4, the circuits being then individualized by sawing of the wafer obtained after the implementation of the steps illustrated in FIG. 5.

The above method provides a photonic integrated circuit comprising waveguides 20 embedded in the insulating layer 32 of an SOI-type structure. The integrated circuit comprises two waveguide levels, a first level comprising waveguides 20, and a second level comprising single-crystal silicon waveguides 52.

In such a method, the deposition of the silicon nitride of layer 10 at a temperature greater than 500° C., preferably greater than 600°, or even greater than or equal to 700° C., enables to decrease the number of N—H bonds in the silicon nitride of layer 10, the number of such bonds decreasing when the silicon nitride forming temperature increases. Such a decrease in the number of N—H bonds in waveguides 20 is particularly advantageous in the case where at least one waveguide 20 is intended to guide an optical signal having a wavelength in the range from 1,500 to 1,600 nm, preferably equal to 1,550 nm. Indeed, the propagation losses of such a signal in a silicon nitride waveguide decrease when the number of N—H bonds in the silicon nitride decreases.

In a silicon nitride waveguide arranged in an interconnection structure of a SOI-type photonic integrated circuit, to decrease the propagation losses of an optical signal having a wavelength in the range from 1,500 to 1,600 nm, or even equal to 1,550 nm, it could have been devised to deposit the silicon nitride of the waveguide at a temperature greater than 500° C., or even greater than 600° C., or even still greater than or equal to 700° C.

However, due to the fact that such a deposition would have been performed after the forming of components from the SOI-type single-crystal silicon layer of the integrated circuit, a disadvantage is that the high temperatures of the deposition would have caused the diffusion of dopant atoms in these components and thus a modification, or even a degradation, of their operating characteristics. In particular, a deposition temperature greater than 500° C. would have caused a diffusion of the dopant atoms into doped germanium, and more particularly a diffusion of the phosphorus atoms into N-type doped germanium, which would for example have resulted in an increase in the dark current of a germanium photodiode of the type described in relation with FIG. 5.

To avoid the above-mentioned disadvantage, it could have been devised to deposit the silicon nitride at a temperature greater than 500° C., or even greater than 600° C., or even greater than or equal to 700° C., on a handle, and then to transfer the silicon nitride onto an insulating layer of the interconnection structure of the circuit before removing the handle and completing the forming of the interconnection structure. This would however have resulted in additional constraints relative to the flatness of this insulating layer of the interconnection structure, and in the provision of an additional transfer or assembly step with respect to the method described in relation with FIGS. 1 to 5.

More generally, as compared with a method where a silicon nitride layer would have been formed on a handle before transferring or bonding this layer onto a wafer to then define nitride waveguides therein, the above method is simpler to implement due to the fact that it does not comprise the transfer step, nor does it comprise the corresponding constraints of flatness of the surface onto which the nitride layer would be transferred.

Figure 6:
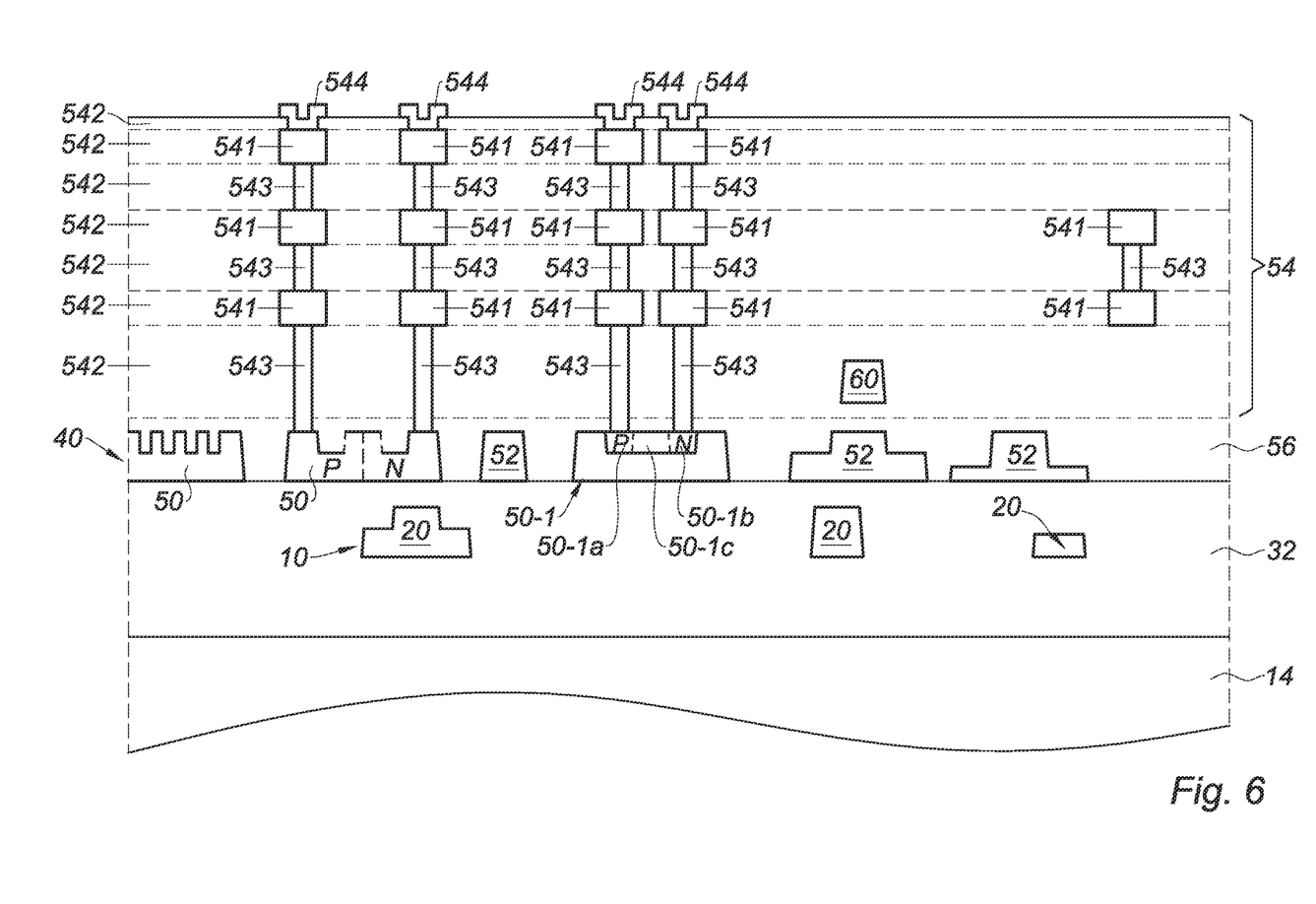
FIG. 6 is a simplified cross-section view illustrating an alternative embodiment of the manufacturing method.

FIG. 6 is a simplified cross-section view illustrating an alternative embodiment of the manufacturing method described hereinabove in relation with FIGS. 1 to 5. More particularly, FIG. 6 illustrates an alternative embodiment of the step of forming interconnection structure 54. Only the differences between the step of forming the interconnection structure 54 described in relation with FIG. 5 and that described in relation with FIG. 6 are highlighted.

As compared with the embodiment described in relation with FIG. 5, in the alternative embodiment illustrated in FIG. 6, it is provided to form at least one waveguide 60 in interconnection structure 54. The forming of one or a plurality of waveguides 60 in an insulating layer 542 of interconnection structure 54 is within the abilities of those skilled in the art, for example, by successive steps of deposition, masking, and etching of a layer to define waveguides 60 therein, these steps being followed by a step of deposition of an insulating layer 542.

FIG. 6 shows a single waveguide. In this example, waveguide 60 is a strip waveguide, although waveguides 60 having a cross-section with a different shape may be provided.

According to an embodiment, waveguide(s) 60 are made of the same material as waveguides 20, the insulating layer 542 of interconnection structure 54 which has waveguide(s) 60 embedded therein preferably being made of the same material as layer 32.

As a variation, waveguide(s) 60 are made of a material different from that of waveguides 20, and/or are embedded in a layer 542 made of a material different from that of layer 32.

Further, waveguides 60 may be configured to guide a signal at a wavelength different from that of the signal guided by waveguides 20.

As an example, waveguides 20 are capable of guiding a signal at a wavelength in the range from 1,500 to 1,600 nm, preferably equal to 1,550 nm, and waveguides 60 are capable of guiding a signal at a wavelength in the range from 1,260 to 1,360 nm, preferably equal to 1,310 nm. In this example, in the case where waveguides 60 are made of silicon nitride, the silicon nitride of waveguides 60 may be deposited at a temperature lower than 500° C. with no influence on the propagation losses in waveguides 60.

Further, such an alternative embodiment enables to obtain a photonic integrated circuit comprising three waveguide levels, a first level comprising waveguides 20, a second level comprising waveguides 52, and a third level comprising waveguides 60.

An example where waveguides 20 are made of silicon nitride and layer 32 is made of silicon oxide has been described in relation with FIGS. 1 to 6. It will be within the abilities of those skilled in the art to adapt the described example to the case of waveguides 20 made of a first material other than silicon nitride, for example, a first material that may require a deposition at a temperature greater than 500° C., or even greater than 600° C., or even still greater than or equal to 700° C. As an example, waveguides 20 may be made of SiON or of $Al_2O_3$, the material of layer 32 being accordingly adapted.

Although this has not been detailed, it will be within the abilities of those skilled in the art to select the first material of waveguide 20 and the second material of layer 32 having waveguides 20 embedded therein, for example, so that the refraction index of the second material is smaller than that of the first material and, possibly, than that of the single-crystal silicon.

Further, it will be within the abilities of those skilled in the art to determine the dimensions of waveguides 20, 52, and/or 60, particularly of their cross-sections, according to the optical signals propagated and guided by such waveguides. In particular, the above-described embodiments are not limited to the case of optical signals having a wavelength in the range from 1,260 to 1,360 nm or from 1,500 nm to 1,600 nm.

Various embodiments and variations have been described. It will be understood by those skilled in the art that certain features of these various embodiments and variations may be combined, and other variations will occur to those skilled in the art. In particular, it will be within the abilities of those skilled in the art to adapt the thickness of layers 10, 12, 30, and/or 40 according to the targeted dimensions of the cross-sections of waveguides 20 and/or 52.

Finally, the practical implementation of the described embodiments and variations is within the abilities of those skilled in the art based on the functional indications given hereinabove. In particular, it will be within the abilities of those skilled in the art to provide etch mask alignment marks, for example, so that a waveguide 20 is formed at a location that enables it to be optically coupled to a waveguide 52 and/or to optoelectronic components 50.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method comprising:
    providing a silicon substrate and covering the silicon substrate with a first layer;
    after covering the silicon substrate, forming a layer made of a first insulating material on the first layer made of a second insulating material that covers the silicon substrate;
    defining a waveguide made of the first insulating material in the layer of the first insulating material;
    covering the waveguide made of the first insulating material with a second layer of the second insulating material;
    planarizing an upper surface of the second layer of the second insulating material; and
    forming a single-crystal silicon layer over the second layer.

2. The method of claim 1, wherein the first insulating material comprises silicon nitride and the second insulating material comprises silicon oxide.

3. The method of claim 1, wherein forming the layer made of the first insulating material comprises depositing the first insulating material at a temperature greater than 600° C.

4. The method of claim 1, wherein forming the layer made of the first insulating material comprises forming the layer of the first insulating material by low pressure chemical vapor deposition (LPCVD).

5. The method of claim 1, wherein the waveguide made of the first insulating material is configured to propagate an optical signal having a wavelength in a range from 1,500 to 1,600 nm.

6. The method of claim 1, wherein the waveguide made of the first insulating material is configured to propagate an optical signal having a wavelength equal to 1,550 nm.

7. The method of claim 1, wherein forming the single-crystal silicon layer over the second layer comprises performing a wafer bonding process to attach the single-crystal silicon layer over the second layer.

8. The method of claim 1, further comprising forming a germanium photodiode at the single-crystal silicon layer.

9. The method of claim 1, further comprising forming an interconnection structure over the single-crystal silicon layer.

10. A method comprising:
    providing a silicon substrate;
    forming a layer made of a first insulating material on a first layer made of a second insulating material that covers the silicon substrate;
    defining a waveguide made of the first insulating material in the layer of the first insulating material;
    covering the waveguide made of the first insulating material with a second layer of the second insulating material;
    planarizing an upper surface of the second layer of the second insulating material;
    forming a single-crystal silicon layer over the second layer; and
    defining a silicon waveguide in the single-crystal silicon layer.

11. The method of claim 10, wherein forming the single-crystal silicon layer over the second layer comprises performing a wafer bonding process to attach the single-crystal silicon layer over the second layer.

12. The method of claim 10, wherein the first insulating material comprises silicon nitride and the second insulating material comprises silicon oxide.

13. A method comprising:
    providing a silicon substrate and covering the silicon substrate with a first layer;
    after covering the silicon substrate, forming a layer made of a first insulating material on the first layer made of a second insulating material that covers the silicon substrate;
    defining a waveguide made of the first insulating material in the layer of the first insulating material;
    covering the waveguide made of the first insulating material with a second layer of the second insulating material;
    planarizing an upper surface of the second layer of the second insulating material;
    forming a single-crystal silicon layer over the second layer; and
    forming an interconnection structure over the single-crystal silicon layer, wherein forming the interconnection structure comprises forming an insulating layer over the single-crystal silicon layer and forming another waveguide embedded in the insulating layer of the interconnection structure.

14. The method of claim 13, wherein the another waveguide is made of the first insulating material and the insulating layer of the interconnection structure is made of the second insulating material.

15. The method of claim 13, wherein the first insulating material comprises silicon nitride and the second insulating material comprises silicon oxide.

16. The method of claim 13, wherein forming the layer made of the first insulating material comprises depositing the first insulating material at a temperature greater than 600° C.

17. The method of claim 13, wherein forming the layer made of the first insulating material comprises forming the layer of the first insulating material by low pressure chemical vapor deposition (LPCVD).

18. The method of claim 13, wherein the waveguide made of the first insulating material is configured to propagate an optical signal having a wavelength in a range from 1,500 to 1,600 nm.

19. The method of claim 13, wherein the waveguide made of the first insulating material is configured to propagate an optical signal having a wavelength equal to 1,550 nm.

20. The method of claim 13, further comprising defining a silicon waveguide in the single-crystal silicon layer.

21. The method of claim 13, further comprising forming a germanium photodiode at the single-crystal silicon layer.

* * * * *

UNITED STATES PATENT AND TRADEMARK OFFICE
CERTIFICATE OF CORRECTION

Page 1 of 1

PATENT NO. : 12,147,105 B2
APPLICATION NO. : 17/988141
DATED : November 19, 2024
INVENTOR(S) : Sebastien Cremer It is certified that error appears in the above-identified patent and that said Letters Patent is hereby corrected as shown below:

In the Claims

In Column 9, Line 23, Claim 1:
Change "substrate with a first laver;"
To --substrate with a first layer;--

Signed and Sealed this
Thirty-first Day of December, 2024

Derrick Brent
*Acting Director of the United States Patent and Trademark Office*